June 11, 1963

K. SENNEWALD ET AL 3,093,696

PROCESS FOR THE MANUFACTURE OF MONOVINYL
ACETYLENE OF HIGH PURITY

Filed Dec. 2, 1958

2 Sheets-Sheet 1

*FIG. 1*

INVENTORS:
KURT SENNEWALD,
FRANZ POHL,
WILLI MEININGER,
WILHELM VOGT

BY
*Connolly and Hutz*

THEIR ATTORNEYS

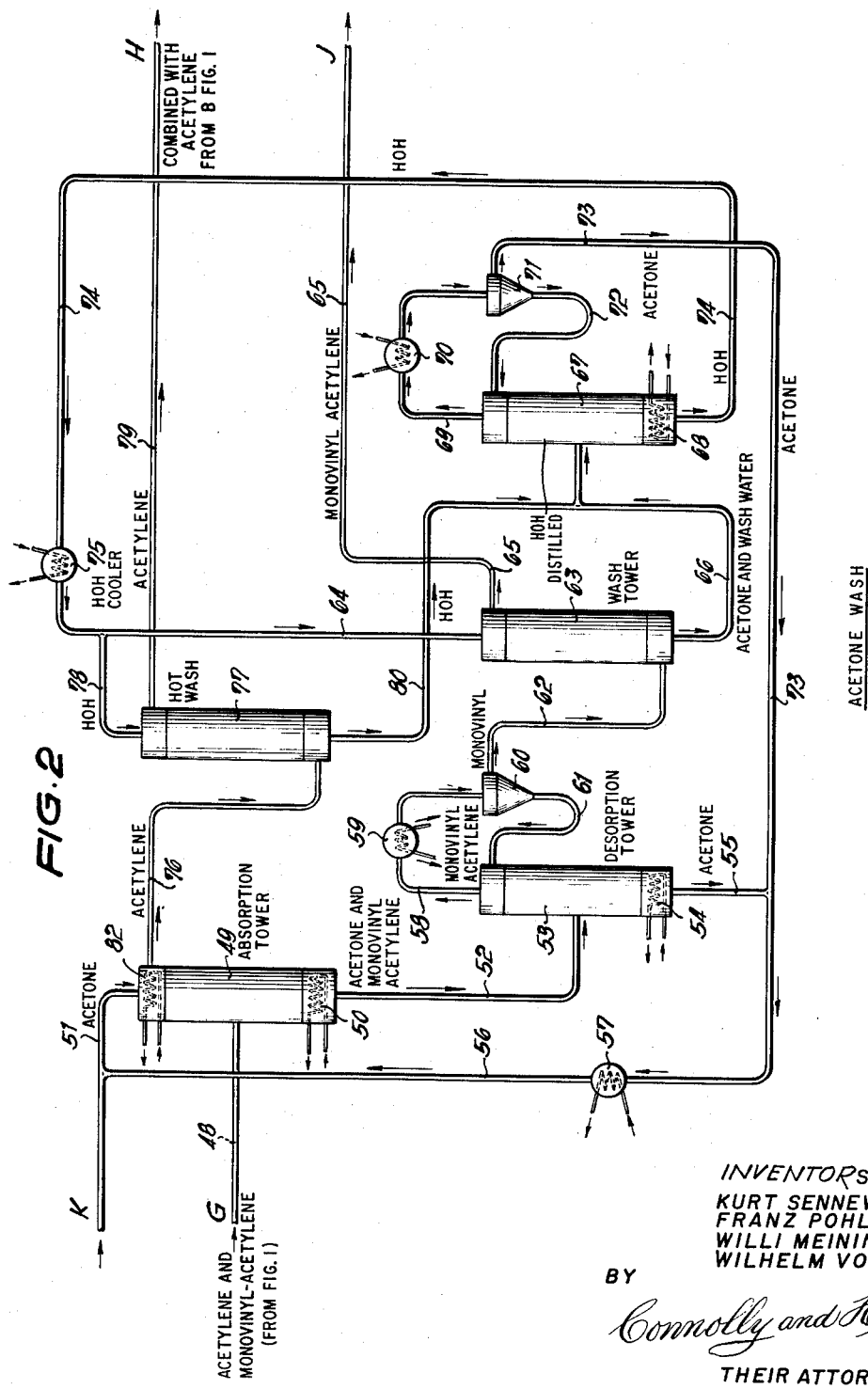

United States Patent Office 3,093,696
Patented June 11, 1963

3,093,696
PROCESS FOR THE MANUFACTURE OF MONO-
VINYL ACETYLENE OF HIGH PURITY
Kurt Sennewald and Franz Pohl, Knapsack, near Cologne,
Willi Meininger, Efferen, near Cologne, and Wilhelm
Vogt, Knapsack, near Cologne, Germany, assignors to
Knapsack - Griesheim Aktiengesellschaft, Knapsack,
near Cologne, Germany, a corporation of Germany
Filed Dec. 2, 1958, Ser. No. 777,693
Claims priority, application Germany Dec. 11, 1957
7 Claims. (Cl. 260—678)

The present invention relates to a process for the manufacture of monovinyl acetylene of high purity from a moist gas mixture containing acetylene.

In the manufacture of monovinyl acetylene or acrylonitrile, it is known to use so-called Nieuwland catalysts, i.e. aqueous cuprous chloride solutions combined with hydrochloric acid and containing, in general, ammonium chloride or other salts capable of dissolving cuprous chloride with the formation of complex compounds.

In the manufacture of monovinyl acetylene, acetylene alone is conducted through the catalyst while in the preparation of acrylonitrile, the introduced acetylene is admixed with hydrocyanic acid. Depending on the proportion of acetylene/hydrocyanic acid, larger or smaller amounts of monovinyl acetylene are obtained in addition to acrylonitrile.

Besides these two main reactions, the Nieuwland catalyst always induces side reactions which take place simultaneously such as the trimerization, that is to say the additive combination of acetylene with monovinyl acetylene to yield divinyl acetylene, the dimerization of monovinyl acetylene and, furthermore, the formation of higher acetylene polymers which may yield resinous products. Further side reactions are, for example, the addition reaction of water and hydrogen chloride with acetylene and monovinyl acetylene to yield acetaldehyde, methylvinyl ketone, vinyl chloride and chloroprene. Among the last-mentioned side reactions, the formation of acetaldehyde and vinyl chloride predominate. In case acrylonitrile is simultaneously produced, there are furthermore obtained lactic acid nitrile, cyano-butadiene and other substances.

In the manufacture of monovinyl acetylene and acrylonitrile, the aforesaid side reactions are highly undesired. They reduce the yield, involve interruptions of work and increased losses of catalyst due to resinifications and complicate the manufacture of pure monovinyl acetylene or acrylonitrile.

It is possible to reduce the formation of the particularly undesired acetylene compounds, such as divinyl acetylene, and the higher acetylene polymers as well as the formation of chloroprene and methylvinyl ketone by maintaining a low partial pressure of the monovinyl acetylene in the reaction chamber. This necessitates the use of a large excess of acetylene in the reactions. It is, therefore, necessary, on the one hand, to isolate the desired as well as the undesired reaction products present in the acetylene current in a very low concentration. Care must be taken that at least the desired products are obtained in a very pure state, and, on the other hand, to liberate the acetylene which is recycled into the reaction as quantitatively as possible from the reaction products.

The present invention provides a process for the manufacture of pure monovinyl acetylene and it is immaterial whether the monovinyl acetylene is present as a valuable by-product of the manufacture of acrylonitrile or as principal product without the simultaneous formation of acrylonitrile. In the case of a simultaneous production of monovinyl acetylene and acrylonitrile in separate reactors operated under different conditions, it may even be of special industrial and economical advantage to combine the gas cycles of both processes after the reaction has taken place and after the separation of acrylonitrile, for example, by a water wash, to isolate subsequently and produce pure monovinyl acetylene in a single unit and then to distribute again the purified acetylene among the individual reactors.

Attempts have already been made to cool the entire gas current, for example, to −70° C. in order to eliminate by condensation the substances having a higher boiling point than acetylene and then to separate the condensation product by distillation. Said method of working is unprofitable from the first on account of the great refrigerating power which is particularly expensive and the exceptionally large gas coolers, condensers and heat exchangers required. Moreover, the distillation of the condensate which must also be conducted at low temperatures is not only difficult and expensive but also extremely dangerous since monovinyl acetylene, for example, tends toward explosive decomposition more than acetylene.

In the manufacture of acrylonitrile, it has likewise been proposed to extract the by-products obtained in said process, above all the monovinyl acetylene, with the acrylonitrile itself. The extracted substances and the dissolved acetylene are then expelled again by distillation whereby a reflux is produced by partial condensation. The gases leaving at the head of the column and mainly consisting of originally dissolved acetylene are then subjected again to a partial condensation whereby a further concentration of monovinyl acetylene above all is brought about. It is not possible, however, to separate the by-products from one another or to obtain monovinyl acetylene of high purity which is completely free of acetylene and by-products. But this was not the problem of said known process which was only to bring about the purification of the recycled acetylene current.

It has furthermore been proposed to wash the reaction gas produced in the manufacture of monovinyl acetylene or acrylonitrile after the water wash with a solvent mixture containing acetone predominately. It turned out, however, that in case the cycle gas contains relatively small amounts of monovinyl acetylene, uneconomic amounts of acetone must be used as solvent in order to wash out the gas satisfactorily and to isolate and obtain the entire portion of monovinyl acetylene.

Now, we have found that it is of economical and industrial advantage to add an oil wash before the acetone wash. The characteristic feature of the present invention consists in the ingenious combination of two washing stages. In the first stage a pure cycle gas, namely acetylene, is obtained which is reconducted to the starting reaction while in the second stage, monovinyl acetylene is removed from the remaining gas current.

The process of the present invention for the manufacture of monovinyl acetylene of high purity from a moist acetylene-containing gas mixture is carried out as follows: the cooled and deacidified gas mixture flowing off after the manufacture of monovinyl acetylene or acrylonitrile which has been freed of acrylonitrile by a water wash is conducted to a combined two-stage washing in which there is obtained in the first stage the main quantity of acetylene that is recycled to the starting reaction and divinyl acetylene, chloroprene, higher boiling acetylene polymers and a gas mixture consisting of the total quantity of monovinyl acetylene and portions of acetylene. Said gas mixture is then conducted to the second stage where it is separated into monovinyl acetylene as final product and residual acetylene which is also recycled to the starting reaction together with the cycle gas.

The gas mixture used as starting material is relieved of monovinyl acetylene, divinyl acetylene, chloroprene, higher boiling acetylene polymers and a portion of the acetylene in a first reaction stage by an oil wash. The main quantity of the acetylene remaining is recycled to the starting reaction. The acetylene and monovinyl acetylene dissolved in the sump of the oil wash are expelled by heating and conducted to the second stage where the acetone wash takes place, if desired, after having passed through a second oil wash. In the second stage, the monovinyl acetylene is absorbed in the solvent while the acetylene is recycled to the starting reaction after having been washed with water. The monovinyl acetylene is then expelled from the solvent by heating and obtained as pure final product after having been washed with water.

According to a further feature of the invention, the blowing-out of the residual monovinyl acetylene, divinyl acetylene and chloroprene following the oil wash, and the subsequent elimination of the acetylene portion and monovinyl acetylene contained in the oil is brought about by means of a portion of the starting gas mixture which has been branched off before the oil wash whereby only a mixture of oil and higher boiling acetylene polymers is removed as sump product. The gas mixture leaving at the head is condensed, the condensate heated for expelling monovinyl acetylene, which travels to the oil after-wash and then blowed out for example by means of inert gas, flue gas or combustion gas such as coke oven gas or carbide furnace gas for separating of divinyl acetylene and chloroprene. The oil flowing off after the divinyl acetylene and chloroprene elimination has taken place is then reconducted into the oil cycle. The mixture of oil and higher boiling acetylene polymers obtained as sump product of the blowing-out process with starting gas mixture passes partially into the oil cycle and thus, after having been cooled, into the oil wash or after wash and is partially conducted to an oil distillation in which the higher boiling acetylene polymers are obtained as residue while the pure oil travels back into the oil cycle.

The wash waters obtained in the water washes for the removal of acetone from the acetylene and monovinyl acetylene are worked up in the process of the invention by distillation. After cooling, the water is then recycled as wash water whereas the acetone is combined, after having been cooled, with the cycle solvent for the absorption and subsequent desorption of monovinyl acetylene.

As wash oils in the first stage, there are particularly suitable aromatic hydrocarbons, above all branched and polycyclic hydrocarbons having a boiling point in the range from about +170° C. to +220° C., for example aromatic tar oils having a content of 95% by weight of aromatic substances. Preferably, alkylated aromatic substances, which have a boiling point in the range from about +170° C. to 190° C. are used. Wash oils of this kind have an absolute solubility and a great selectivity for monovinyl acetylene whereas they absorbed acetylene to a small extent only. Consequently, the desired concentration of monovinyl acetylene takes place.

The following substances are obtained in the process of the invention: acetylene as cycle gas, monovinyl acetylene as pure final product, divinyl acetylene and chloroprene as dangerous components, and higher boiling acetylene polymers as harmless components and simultaneously as residue. The dangerous waste products, i.e. divinyl acetylene and chloroprene, are blown out by means of combustion gas and thus destroyed rationally since they increase the calorific value of said gases which may serve for the production of steam.

In addition to acetylene, there are conducted in a cycle the wash oil, the solvent acetone as second washing liquid and the wash water. The extraction in the second stage can also be performed by means of oil (as defined above) instead of the acetone. In this case two wash oil cycles represent the combined process according to the invention. It may also be possible to use other suitable washing liquids for carrying out the two-stage washing according to the invention.

The accompanying drawings diagrammatically represent suitable units for carrying out the process of the invention. FIGURE 1 shows the first stage and FIGURE 2 the second stage, the first stage being an oil wash and the second one an acetone wash.

The reaction gases leaving the monovinyl acetylene or the acrylonitrile reactor are conducted after having been cooled, deacidified and freed of acrylonitrile at A (FIGURE 1), into the first stage of the two-stage washing according to the invention. The reaction gases have a content of monovinyl acetylene in the range from about 0.5–4.0% by volume, a temperature of about +15° C. to +30° C. and are under a pressure of about 2–3 atmospheres absolute.

After having branched off a partial current via conduit 11, the main quantity of the reaction gases are introduced into wash tower 1 at the bottom by way of inlet 2. In wash tower 1, the gases are subjected to an oil washing at a temperature in the range from about 0 to +30° C. and under a pressure of 2–3 atmospheres absolute. Wash tower 1 is charged with wash oil by way of inlet 4 while acetylene escapes at B via upper outlet 3 and is reconducted into the reactor not shown for being reacted again. The continuously cycled wash oil is replaced at C as it is consumed.

The oil charged with monovinyl acetylene, divinyl acetylene, chloroprene, higher boiling acetylene polymers etc. leaves wash tower 1 together with part of the acetylene by way of bottom outlet 6 and passes through relief valve 7 into heater 8 where the main quantity of monovinyl acetylene and acetylene dissolved in the oil is expelled. Said quantity is then introduced by way of head outlet 43 into wash tower 45 at the bottom for being after-washed with oil. Wash tower 45 is charged via head inlet 46 with cycle wash oil which travels after the washing process through bottom outlet 47 also into heater 8. At the head of wash tower 45, in which the oil after wash is performed, a mixture of pure acetylene and monovinyl acetylene is removed via outlet 48 and leaves at G the first stage of the combined two-stage wash. Said gas mixture contains between about 20–60% by volume of monovinyl acetylene, depending on the method of working of the oil wash, the rest being acetylene.

The oil charged with a small amount of monovinyl acetylene and the whole amount of divinyl acetylene, chloroprene and higher boiling acetylene polymers is conducted from heater 8 into extraction column 10 via bottom outlet 9. Extraction column 10 is fed at the bottom by way of conduit 11 and interposed relief valve 12 with the reaction gas as expulsion gas branched off before wash tower 1 from inlet pipe 2. Said expulsion gas blows out the residual conovinyl acetylene, the divinyl acetylene and chloroprene of the sump of heater 8 and passes by way of head outlet 28 of extraction column 10 into condensers 29 and 31, the latter being operated by means of compressor 30 under an elevated pressure of up to about 2.5 atmospheres absolute. In condensers 29 and 31, the entrained oil portions, the monovinyl acetylene and the total amount of divinyl acetylene and chloroprene are separated and combined via outlet pipes 32 and 33 provided with relief valve 34 in inlet pipe 35 of heater 36 while the residual expulsion gas from condensers 29 and 31 is introduced by way of outlet 81 into inlet pipe 2 of the reaction gases to wash tower 1.

In heater 36, the monovinyl acetylene is expelled and then conducted via head outlet 44 into wash tower 45 at the bottom where it is after-washed with oil. The material discharged at the bottom of heater 36 is introduced via siphon 37 into extraction column 38 at the head, which column is provided near the bottom with heater 39. Extraction column 38 is fed at the bottom via inlet 40 with an inert gas or combustion gas, for example carbide furnace gas, introduced at D and serving to expel the dangerous portions of divinyl acetylene and chloroprene from the material discharged at the bottom of heater 36. Said expulsion gas charged with divinyl acetylene and chloroprene leaves extraction column 38 by way of head outlet 41 and is removed at E. It may be used, for example, as fuel gas, for the generation of steam. The oil flowing off at extraction column 38 by way of bottom outlet 42 is reconducted into oil cycle pipe 26 and travels via cooler 5 to head inlets 4 and 46 respectively of wash towers 1 and 45.

The mixture of oil and higher boiling acetylene polymers leaving extraction column 10 by way of bottom outlet 13 is partially removed via branch circuit 14 provided with cooler 15 into oil cycle conduit 26, and partially conducted by way of branch circuit 16 into distilling column 17 where the oil is distilled, and which is provided near the bottom with heater 18. In distilling column 17 the amount of higher boiling and dangerous acetylene polymers contained in the oil (about 5%) are obtained as residue and removed at F via bottom outlet 27. The distilled oil passes via head outlet 19 and cooler 20 into receiver 21, provided at the bottom with reflux conduit 22 to distilling column 17, and from receiver 21 into overflow pipe 23 through which the oil is reconducted into oil cycle pipe 26 by way of circulating pump 24 and outlet 25.

The mixture of acetylene and monovinyl acetylene leaving the first stage of the combined two-stage wash at G (FIGURE 1) enters the second stage at G (FIGURE 2) under a pressure of 1 to about 1.5 atmospheres absolute and passes via conduit 48 into absorption tower 49 where the monovinyl acetylene is absorbed. Said absorption tower 49 is provided near the bottom with heater 50 and near the head with cooler 82. It is charged via head inlet 51 with acetone as solvent introduced or completed at K, while acetylene is removed by way of upper outlet 76 and introduced into water wash tower 77 at the bottom thereof. Wash tower 77 is fed via head inlet 78 with water pre-cooled in cooler 75. After having washed out the acetylene current, the water flows off via bottom outlet 80 and passes into distilling column 67 where it is purified by distillation. The pure acetylene leaves wash tower 77 via upper outlet 79 and the second stage of the two-stage washing at H. It is then combined with the acetylene leaving the first stage at B and recycled to the starting reaction in the reactor not shown.

The solvent acetone leaves together with the monovinyl acetylene absorption tower 49 via bottom outlet 52 and is conducted to desorption column 53 provided near the bottom with heater 54. In column 53 the monovinyl acetylene is desorbed and leaves said column by way of head outlet 58, condenser 59 and gas separator 60. The material flowing off at the bottom of gas separator 60 through outlet 61 is recycled to the head of desorption column 53, while the monovinyl acetylene is conducted via overflow outlet 62 into washing tower 63 at the bottom where it is washed with water. Wash tower 63 is fed by way of head inlet 64 with wash water which has been precooled in cooler 75. The pure but still moist monovinyl acetylene obtained as final product is removed from washing tower 63 via upper outlet 65 and leaves the apparatus at J for further processing, for example in a chloroprene unit.

The wash water charged with acetone from washing tower 63 flows off by way of bottom outlet 66 and travels together with the material leaving wash tower 77 at the bottom into distilling column 67 provided near the bottom with heater 68. The acetone expelled in distilling column 67 passes via head outlet 69, condenser 70, receiver 71 and overflow outlet 73 into solvent cycle 56 and thus, after having been cooled in cooler 57, again into head inlet 51 of absorption tower 49 serving for the monovinyl absorption. The material discharged at the bottom of receiver 71 is conducted by way of reflux pipe 72 to the head of distilling column 67 and the pure water discharged at the bottom of distilling column 67 is recycled via bottom outlet 74, cooler 75, head inlets 78 and 64 into wash towers 77 and 63 where it is reused for washing out the entrained acetone of the acetylene or monovinyl acetylene gas current.

The acetone discharged at the bottom of distilling column 53 is reconducted via bottom outlet 55 into the solvent or acetone cycle 56.

The following examples serve to illustrate the invention, but they are not intended to limit it thereto:

*Example 1*

The reaction gas arriving at (A) from the preceding water wash where it has been freed of acrylonitrile consists of 63.78 Nm.$^3$ (measured under normal conditions of temperature and pressure, N.T.P.) of acetylene, 32.87 Nm.$^3$ of nitrogen, 2.144 Nm.$^3$ of monovinyl acetylene, 0.074 Nm.$^3$ of divinyl acetylene, 0.074 Nm.$^3$ of vinyl chloride and 1.99 Nm.$^3$ of water. It is kept under a pressure of 2.4 atmospheres absolute and has a temperature of $+30°$ C. A partial current of 6.3 Nm.$^3$ of said reaction gas mixture is branched off by way of conduit 11 and relief valve 12 and introduced into extraction tower 10. The main quantity of the reaction gas is combined with 6.08 Nm.$^3$ of a gas arriving via conduit 81 under a pressure of 2.4 atmospheres absolute which consists of 65% by volume of acetylene, 33.8% by volume of nitrogen and 1% by volume of monovinyl acetylene. Said gas streams in from condensers 29 and 31 described in the following. Via conduit 2 there are thus introduced a total amount of 100.7 Nm.$^3$ of a gas mixture composed of 63.5% by volume of acetylene, 32.5% by volume of nitrogen, 2.0% by volume of monovinyl acetylene, 0.07% by volume of divinyl acetylene, 0.07% by volume of vinyl chloride and 1.8% by volume of water into washing tower 1 charged with wash oil. As wash oil an aromatic tar oil is used containing 95% by weight of aromatic substances, having a boiling point of $+170°$ C. to $190°$ C. The oil wash is carried out at $+30°$ C. and under a pressure of 2.4 atmospheres absolute. By a supply of 700 kilograms of wash oil by way of head inlet 4 the arriving reaction gases are freed of the reaction products which are soluble in the oil. 94.5 Nm.$^3$ of a gas mixture leave the oil wash by way of outlet 3 under a pressure of 2.2 atmospheres absolute. Said mixture contains 65.4% by volume of acetylene, 35.5% by volume of nitrogen, and traces of water. It travels back by way of outlet (B) to the reactor not shown.

The wash oil charged with the extracted reaction products is now composed of 700 kilograms of oil, 2.44 kilograms of acetylene, 4.86 kilograms of monovinyl acetylene 0.24 kilogram of divinyl acetylene and 0.19 kilogram of vinyl chloride. The 2.44 kilograms of acetylene simultaneously washed out correspond to 3.3% by weight of the 63.78 Nm.$^3$ of acetylene introduced into the wash tower. The charged wash oil leaves the oil wash via bottom outlet 6 and is conducted by way of relief valve 7 into heater 8, the pressure being released to about 1.2–1.3 atmospheres absolute, whereby the monovinyl acetylene gas is removed. At a temperature of $+65-+70°$ C. a gas escapes at the head of heater 8 through outlet 43 containing in addition to acetylene 40–50% by volume of monovinyl acetylene and small amounts of entrained oil and divinyl acetylene. In order to remove the traces of divinyl acetylene and oil the gas mixture is passed into wash tower 45 for the oil after-wash. In wash tower 45 the impurities are washed out at $+5-+10°$ C. by means of 60.0 kilograms of wash oil introduced by way of inlet 46. Said wash oil passes continuously through bottom outlet 47 into heater 8.

Into wash tower 45 there is furthermore introduced monovinyl acetylene through conduit 44 from heater 36 described below. Thus 4.19 Nm.$^3$ of a gas mixture consisting of 51% by volume of acetylene and 49% by volume of monovinyl acetylene are conducted from oil after-wash 45 by way of outlet 48 to the monovinyl acetylene isolation.

The oil heated in heater 8 to $+70°$ C. passes via bottom outlet 9 to the head of extraction column 10 in which the residual monovinyl acetylene gas is removed.

At a sump temperature of +80° C. there are expelled from 760 kilograms of oil the amounts dissolved therein monovinyl acetylene (0.23 kilogram), acetylene (0.3 kilogram) and divinyl acetylene (0.24 kilogram), the 6.3 Nm.$^3$ of reaction gas mentioned above and introduced through conduit 11 serving as explusion gas. The 758 kilograms of oil flowing off at column 10 via bottom outlet 13 now contain only traces of divinyl acetylene and 0.05% by weight of monovinyl acetylene. After having branched off a partial current by way of conduit 16 to enter oil distillation 17, the oil is cooled in coolers 15 and 5 to +15–+20° C. and is then recycled as wash oil by way of conduits 14, 26, 4 and 46 into wash towers 1 and 45 for the oil wash and after-wash. In column 10 the expulsion gas is charged with the compounds dissolved in the wash oil introduced into said column via inlet 9. The gas leaving column 10 by way of head outlet 28 consists of 4.22 Nm.$^3$ of acetylene, 2.05 Nm.$^3$ of nitrogen, 0.15 Nm.$^3$ of monovinyl acetylene, 0.07 Nm.$^3$ of divinyl acetylene and 2.0 kilograms of entrained oil. In condensers 29 and 31 connected in series said gas mixture is cooled from about +70° C. to +20° C., once without pressure 29 and once after compressure 30 under a pressure of 2.4 atmospheres absolute, and is the recycled, as already described, by way of outlet 81 into wash tower 1. Before the gas mixture enters the wash tower where it is washed with oil and is combined in inlet 2 with starting reaction gas. In condensers 29 and 31 a mixture of oil and divinyl acetylene separates on cooling, which mixture still contains dissolved acetylene and monovinyl acetylene. Said mixture consisting of 2.75 kilograms of oil which contains 10% of weight of acetylene, 8.4% by weight of monovinyl acetylene and 8.7% by weight of divinyl acetylene travels via conduit 35 to heater 36 where the monovinyl acetylene is removed. By heating the oil mixture again to +70° C. there are expelled 0.24 Nm.$^3$ of acetylene, 0.10 Nm.$^3$ of monovinyl acetylene and traces of divinyl acetylene which are conducted via head outlet 44 into wash tower 45 for being after-washed with oil.

From heater 36 2.24 kilograms of oil containing 11% by weight of divinyl acetylene pass continuously via siphon 37 into expulsion column 38 at the head where the divinyl acetylene is blown off by means of carbide furnace gas introduced at the bottom of column 38 through conduit 40. At a temperature of +80° C. 2.5 Nm.$^3$ of carbide furnace gas are necessary in order completely to remove the divinyl acetylene contained in the coil. The gas containing divinyl acetylene may then be used for operating a contact regeneration. The oil flowing off at the bottom of column 38 is now completely pure and is recycled into oil cycle conduit 26 by way of bottom outlet 42.

In the course of time the cycle wash oil absorbs increasing amounts of nonvolatile higher acetylene polymers which can only be removed by distillation. For this purpose, part of the oil leaving extraction column 10 at the bottom is conducted via branch circuit 16 into distilling column 17 where the oil is subjected to a distillation. Distilling column 17 is operated under a pressure of 150 mm. of mercury and at a sump temperature of +160° C. and is charged with 20 kilograms of oil containing about 5% by weight of polymers. At the head of column 17 18 kilograms of oil are discharged through outlet 19. Simultaneously 2 kilograms of a high-boiling residue are withdrawn from the sump still containing 50% by weight of oil. The product leaving at the head is recycled by way of conduit 25 into the oil cycle and the pump products removed via bottom outlet 27 are burned.

The 4.19 Nm.$^3$ of a gas mixture consisting of 51% by volume of acetylene and 49% by volume of monovinyl acetylene which are under atmospheric pressure travel by way of outlet 48 into absorption tower 49 entering same in the middle. Said absorption tower is charged by way of head inlet 51 with 30 liters of acetone serving to extract the monovinyl acetylene from the gas mixture. The head of absorption tower 49 is maintained at a temperature of +5°–+7° C. by cooling with cold water. The solvent which is completely free of acetylene but contains the total amount of monovinyl acetylene leaves absorption tower 49 by way of bottom outlet 52 at a temperature of +70°–+75° C. and is then freed of the dissolved monovinyl acetylene by distillation in desorption column 53 at a bottom temperature of about +60° C. The monovinyl acetylene escaping by way of head outlet 58 passes through condenser 59 having a cooling temperature of 0° C. whereby a reflux of +15° C. is produced by partial condensation, the refluxed substances being recycled via reflux conduit 61 to the head of desorption column 53. The monovinyl acetylene which has not been condensed leaves intercalated gas separator 60 at the head and passes via conduit 62 into wash tower 63 where it is freed of the entrained solvent vapors by means of 30 liters of water having a temperature of +10°–+15° C. introduced through head inlet 64. 2.05 Nm.$^3$ of moist monovinyl acetylene of practically 100% strength leaves as final product the purification unit by way of outlet 65 and passes for example into a unit for the production of chloroprene.

The gas escaping at the head of absorption tower 49 is completely free of monovinyl acetylene and contains in addition to acetylene (2.13 Nm.$^3$) an entrained amount of acetone. Said gas is introduced into wash tower 77 via conduit 76 where it is freed of the acetone vapors by means of 30 liters of water of +10°–+15° C. introduced through head inlet 78. The gas free of acetone which is saturated with steam is then passed via outlet 79 into outlet 3 of wash tower 1 of the oil wash connected in series where it is combined with the reaction gas recycled to the reactor.

The wash waters leaving wash towers 63 and 77 through bottom outlets 66 and 80 with an acetone content of 7% by weight are worked up in distilling column 67. At a reflux ratio of 1:0.7 about 3 kilograms of acetone having a water content of 5–6% by weight are distilled off from the water-acetone mixture and recycled into the solvent cycle 56 by way of conduits 69 and 73. Distilling column 67 has a bottom temperature of +101° C. 60 liters of water completely free of acetone are removed from distilling column 67 through bottom outlet 74, cooled in cooler 75 to +22° C. and recycled into wash towers 63 and 77 at the head.

The amounts indicated in the present example relate to amounts per one hour.

*Example 2*

Wash tower 1 is charged per hour by way of conduit 2 with 84.57 Nm.$^3$ of a gas mixture having a temperature of +30° C. and being kept under a pressure of 3.0 atmospheres absolute. Said gas mixture is composed of 56% by volume of acetylene, 38.4% by volume of nitrogen, 3.4% by volume of monovinyl acetylene, 0.8% by volume of divinyl acetylene and 1.9% by volume of steam.

The reaction gas enters wash tower 1 at the bottom and is freed of the reaction products that are soluble in oil by means of 600 liters of wash oil (as described in Example 1) introduced per hour. At (B) 78 Nm.$^3$ of a gas mixture composed of 58% by volume of acetylene, 42% by volume of nitrogen and traces of water travel back into the reactor by way of outlet 3 under a pressure of about 2.8 atmospheres absolute and at a temperature of +30° C.

The wash oil leaving wash tower 1 via outlet 6 now consists of 600 kilograms of oil, 3 kilograms of acetylene, 4.9 kilograms of monovinyl acetylene, 0.24 kilogram of divinyl acetylene and 1.3 kilograms of water. The mixture passes into heater 8 where it is treated as described in Example 1. The gas mixture escaping from heater 8 by way of head outlet 43 is after-washed in wash tower 45 with 50 liters of oil. Further 600 liters of acetylene and 240 liters of monovinyl acetylene arrive from second heater 36 in wash tower 45 for the oil after-wash so that a total amount of 5.11 Nm.³ of gas consisting of 58.5% by volume of acetylene and 41.5% by volume of monovinyl acetylene escape at (G) by way of outlet 48.

The oil mixture leaving heater 8 through bottom outlet 9 passes into extraction column 10 at the head where the portions of monovinyl acetylene (0.2 kg.), acetylene (0.26 kg.) and divinyl acetylene (0.2 kg.) dissolved in the oil are blown out by means of about 7 Nm.³ of reaction gas. Part of the 645 kilograms of oil which only contain small traces of acetylene, monovinyl acetylene and divinyl acetylene leaving extraction column 10 via bottom outlet 13 is branched off to oil distillation 17, whereas the main quantity is recycled into oil wash towers 1 and 45 via conduits 14 and 26 after having been cooled in cooler 15.

Together with the reaction gas serving as expulsion gas, 4.15 Nm.³ of acetylene, 2.68 Nm.³ of nitrogen, 0.325 Nm.³ of monovinyl acetylene, 0.05 Nm.³ of divinyl acetylene and 5 kilograms of oil leave extraction column 10 via head outlet 28. The oil and the main quantity of divinyl acetylene are then condensed in following condensers 29 and 31, whereby 0.7 kilogram of acetylene and 0.55 kilogram of monovinyl acetylene are dissolved simultaneously in the condensate, whereas 6.3 Nm.³ of uncondensed gas consisting of 3.55 Nm.³ of acetylene, 2.68 Nm.³ of nitrogen and 0.085 Nm.³ of monovinyl acetylene are recycled via conduit 81 into inlet 2 before wash tower 1 for the oil wash.

The combined condensate from 29 and 31, a total amount of 6.42 kilograms composed of 5 kilograms of oil, 0.7 kilogram of acetylene, 0.55 kilogram of monovinyl acetylene and 0.17 kilogram of divinyl acetylene are heated in heater 36 to +70° C. for the removal of acetylene and monovinyl acetylene. The gas mixture escaping by way of head outlet 44 (600 liters of acetylene, 240 liters of monovinyl acetylene and traces of divinyl acetylene) are conducted into wash tower 45 where it is after-washed with oil whereas the mixture of oil and divinyl acetylene flowing off at the bottom via siphon 37 travels into extraction column 38 where the divinyl acetylene dissolved in the oil (0.17 kg.) is blown out by means of, for example, carbide furnace gas at a temperature of +80° C. as described in Example 1.

The gases containing monovinyl acetylene and leaving wash tower 45 (oil after-wash) are worked up as described in Example 1.

The acetylene/monovinyl acetylene mixture (5.11 Nm.³) consists of 58.5% by volume of acetylene and 41.5% by volume of monovinyl acetylene. It is introduced into absorption tower 49 by way of inlet 48 under a pressure of 1.5 atmospheres absolute. In absorption tower 49 the monovinyl acetylene is removed from the gas mixture by means of 30 liters of acetone introduced through head inlet 51. The head of absorption tower 49 is maintained at +5°—+7° C. by cooling with cold water. From the sump of absorption tower 49 having a temperature of +70°—+75° C. the solvent which is now completely free of acetylene but contains the total amount of monovinyl acetylene is conducted by way of bottom outlet 52 into desorption column 53 where the dissolved monovinyl acetylene is distilled off. Said monovinyl acetylene passes via conduits 58 and 62 into wash tower 63 where, after having washed the gas with 30 liters of water introduced through head inlet 64, 2.13 Nm.³ of moist, but otherwise practically pure monovinyl acetylene are obtained as final product which is removed at (J) by way of conduit 65.

A gas which is free of monovinyl acetylene and consists of pure acetylene and entrained acetone leaves at the head of absorption tower 49 through outlet 76 (2.98 Nm.³). The acetone is removed from the gas by washing it with 30 liters of water in wash tower 77, and the acetylene is recycled via outlet 79 into outlet 3 of wash tower 1 of the oil wash connected in series and thus into the reactor not shown.

We claim:
1. A process for isolating monovinyl acetylene of high purity from a moist, acetylene containing gas formed in the manufacture of an acetylene derivative selected from the group consisting of acrylonitrile and monovinyl acetylene from acetylene, said gas being cooled, deacidified and free of acrylonitrile, which comprises removing from the initial gas stream in a first stage monovinyl acetylene, divinyl acetylene, chloroprene, high boiling acetylene polymers and a minor portion of the acetylene by washing the gas stream with a hydrocarbon solvent as wash oil at a temperature in the range from about 0° to about 30° C., said hydrocarbon solvent possessing a boiling point in the range from about 170° to about 220° C., the major portion of the acetylene remaining in the initial gas stream, heating the wash oil to expel the dissolved minor portion of acetylene and the dissolved monovinyl acetylene, passing the expelled gas mixture of acetylene and monovinyl acetylene to a second stage, and washing with acetone for extracting monovinyl acetylene, the extraction being performed under a temperature being adjusted so that minor amounts of acetylene which are also dissolved in the acetone become permanently reduced in the liquid phase of the acetone, and expelling the monovinyl acetylene from the acetone by heating, and washing the expelled monovinyl acetylene with water to obtain a pure final product.

2. A process as claimed in claim 1 which comprises expelling from the wash oil residual monovinyl acetylene, divinyl acetylene and chloroprene by heating, and simultaneously stripping the oil with a portion of the initial gas stream branched off before the oil wash, whereby a mixture of oil and higher boiling acetylene polymers is obtained as sump product.

3. A process as claimed in claim 2 which comprises condensing the expelled product mixture consisting of monovinyl acetylene, divinylacetylene, chloroprene and minor amounts of wash oil, removing monovinyl acetylene by heating the condensate and passing the gaseous monovinyl acetylene to an oil after-wash, blowing off of divinyl acetylene and chloroprene from the condensate by means of at least one substance selected from the group consisting of inert gas, flue gas, combustible gas, coke oven gas and carbide furnace gas, and recycling the oil flowing off after the elimination of divinyl acetylene and chloroprene has taken place into an oil cycle.

4. A process as claimed in claim 1, which comprises subjecting to an oil after-wash the acetylene and monovinyl acetylene expelled from the oil wash prior to the second stage acetone wash.

5. A process as claimed in claim 2 which comprises conducting the mixture of oil and higher boiling acetylene polymers obtained as sump product of the elimination product mixture partially into the oil cycle and thus, after cooling, to the oil wash and oil after-wash, and partially to an oil distillation wherein the higher boiling acetylene polymers are obtained as residue while the pure oil is recycled into the oil cycle.

6. A process as claimed in claim 2 which comprises recycling between 0% and 100% of the mixture of oil and higher boiling acetylene polymers obtained as sump product of the elimination product mixture into the oil cycle, to the oil wash and oil after-wash, cooling said mixture during the recycling prior to the oil wash, and passing between 100% and 0% of the mixture of oil and higher boiling acetylene polymers to an oil distillation wherein the higher boiling acetylene polymers are obtained as residue while the pure oil is recycled to the oil cycle.

7. A process as claimed in claim 1 which comprises working up by distillation the wash waters obtained in the water washes for the elimination of the acetone from the acetylene and monovinyl acetylene recycling the water after cooling, as wash water and combining the separated acetone after cooling with the cycle solvent acetone for the absorption and subsequent desorption of monovinyl acetylene.

References Cited in the file of this patent

UNITED STATES PATENTS

| | | |
|---|---|---|
| 2,733,259 | De Croes et al. | Jan. 31, 1956 |
| 2,918,141 | Sennewald et al. | Dec. 22, 1959 |